N. MAUGER.
MOTOR TRACTOR WITH PROPULSIVE LEVERS.
APPLICATION FILED MAR. 19, 1919.
1,376,717.
Patented May 3, 1921.
4 SHEETS—SHEET 1.
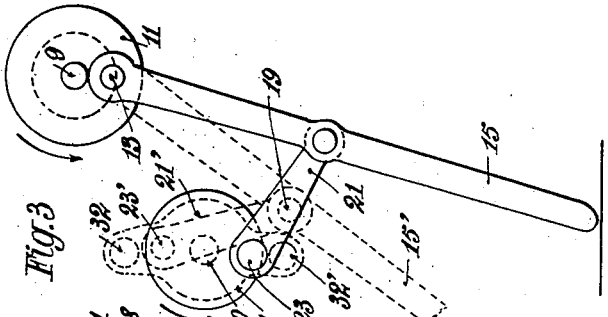
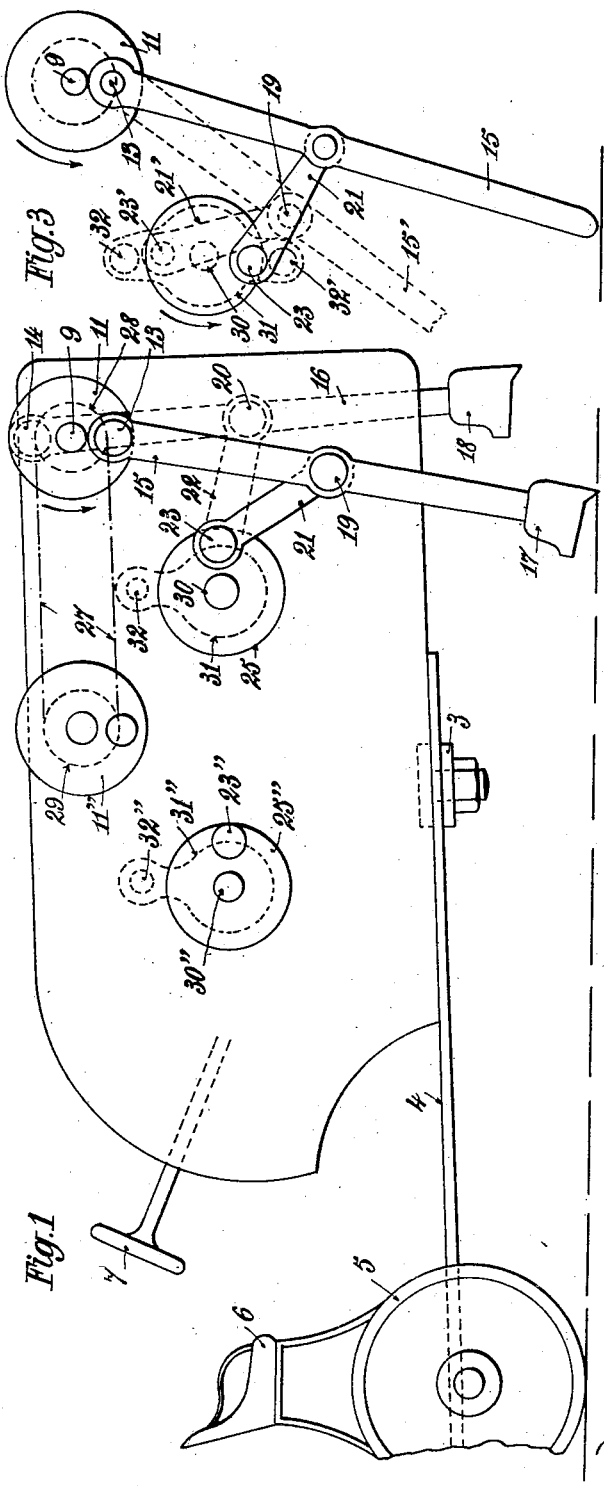
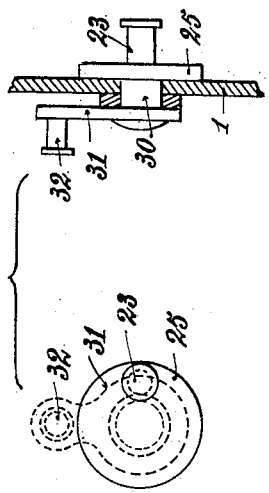
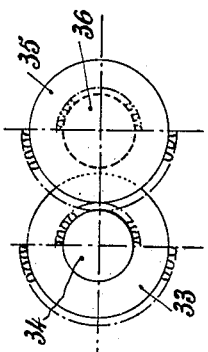

N. MAUGER.
MOTOR TRACTOR WITH PROPULSIVE LEVERS.
APPLICATION FILED MAR. 19, 1919.
1,376,717.
Patented May 3, 1921.
4 SHEETS—SHEET 2.
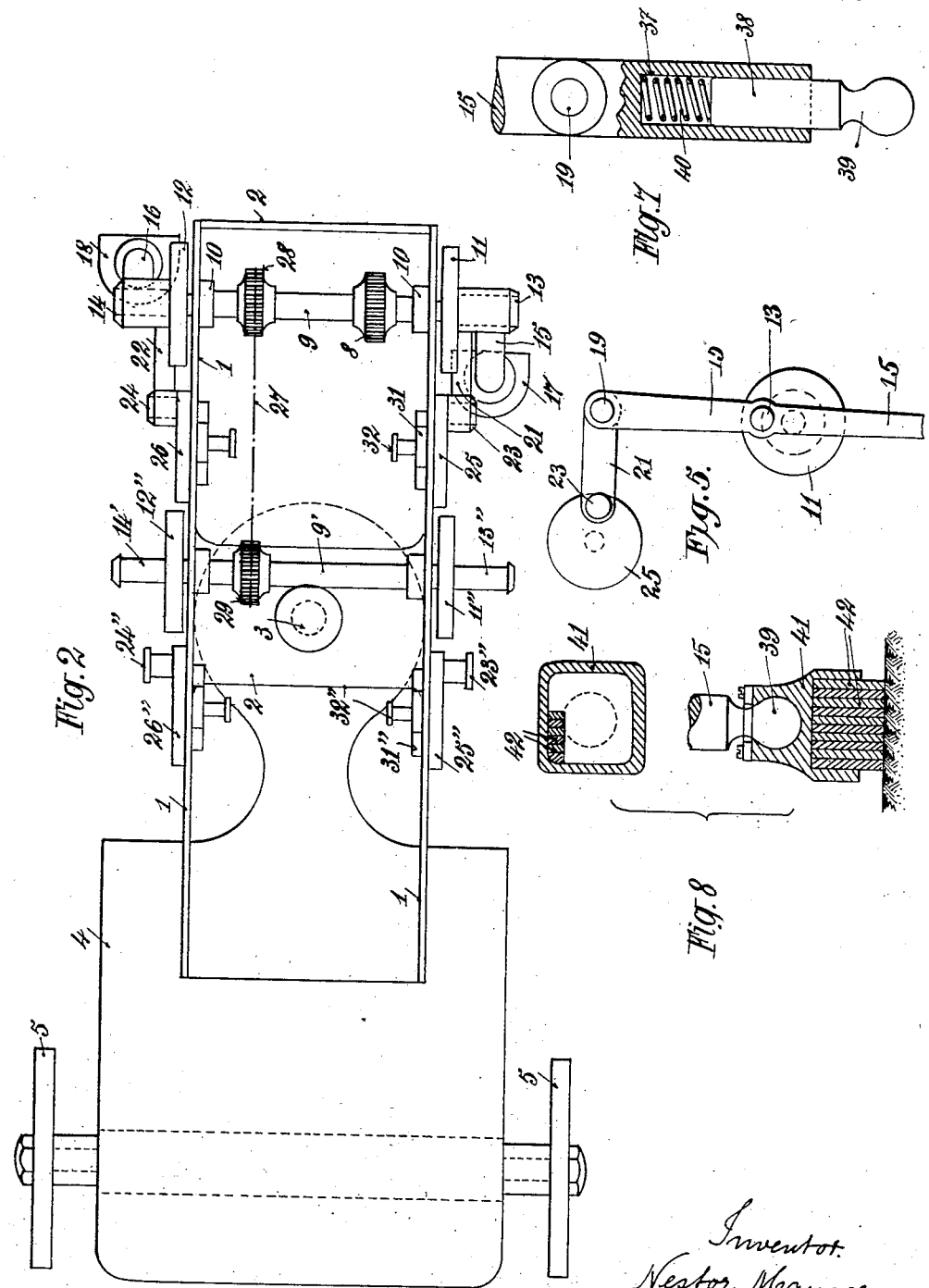

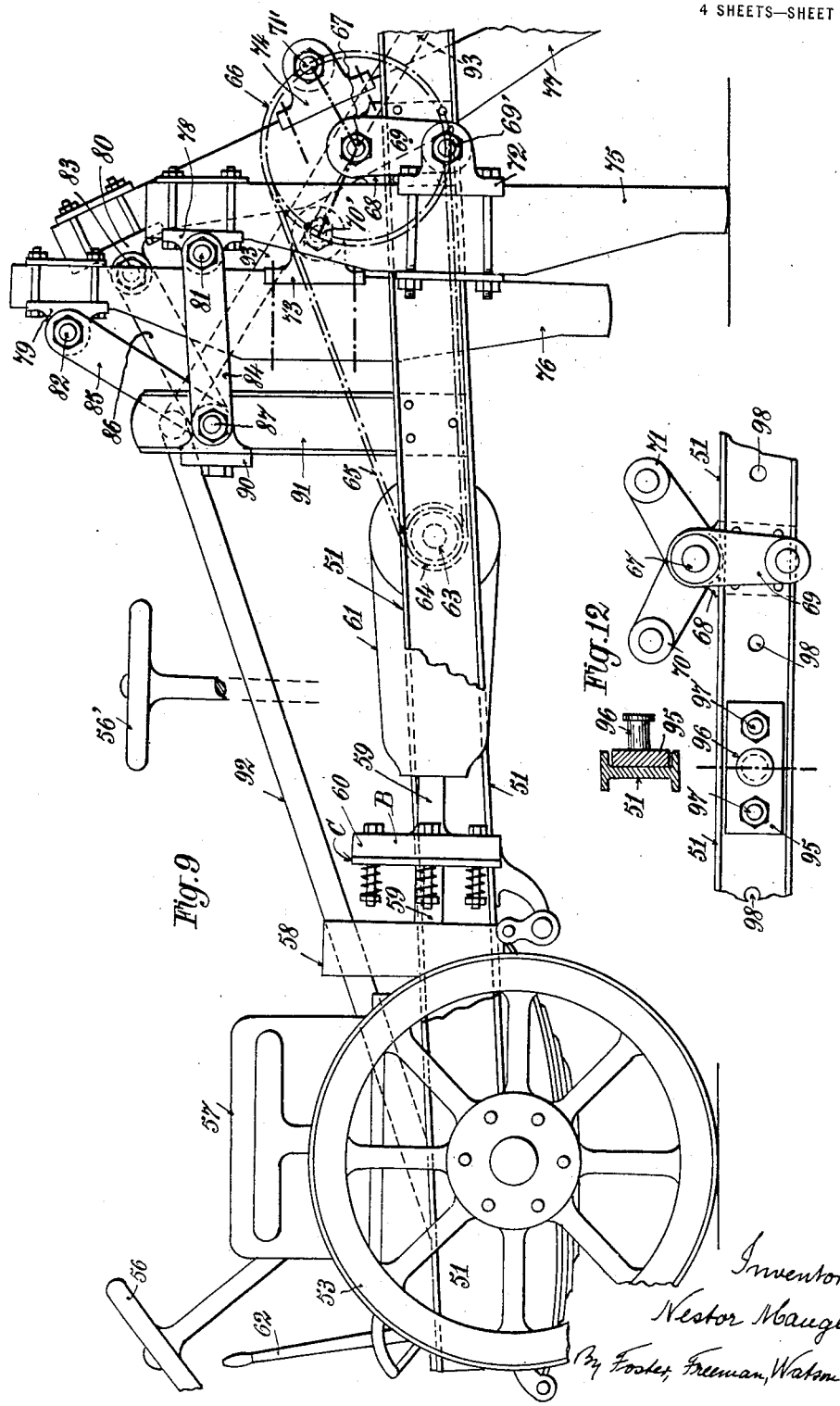

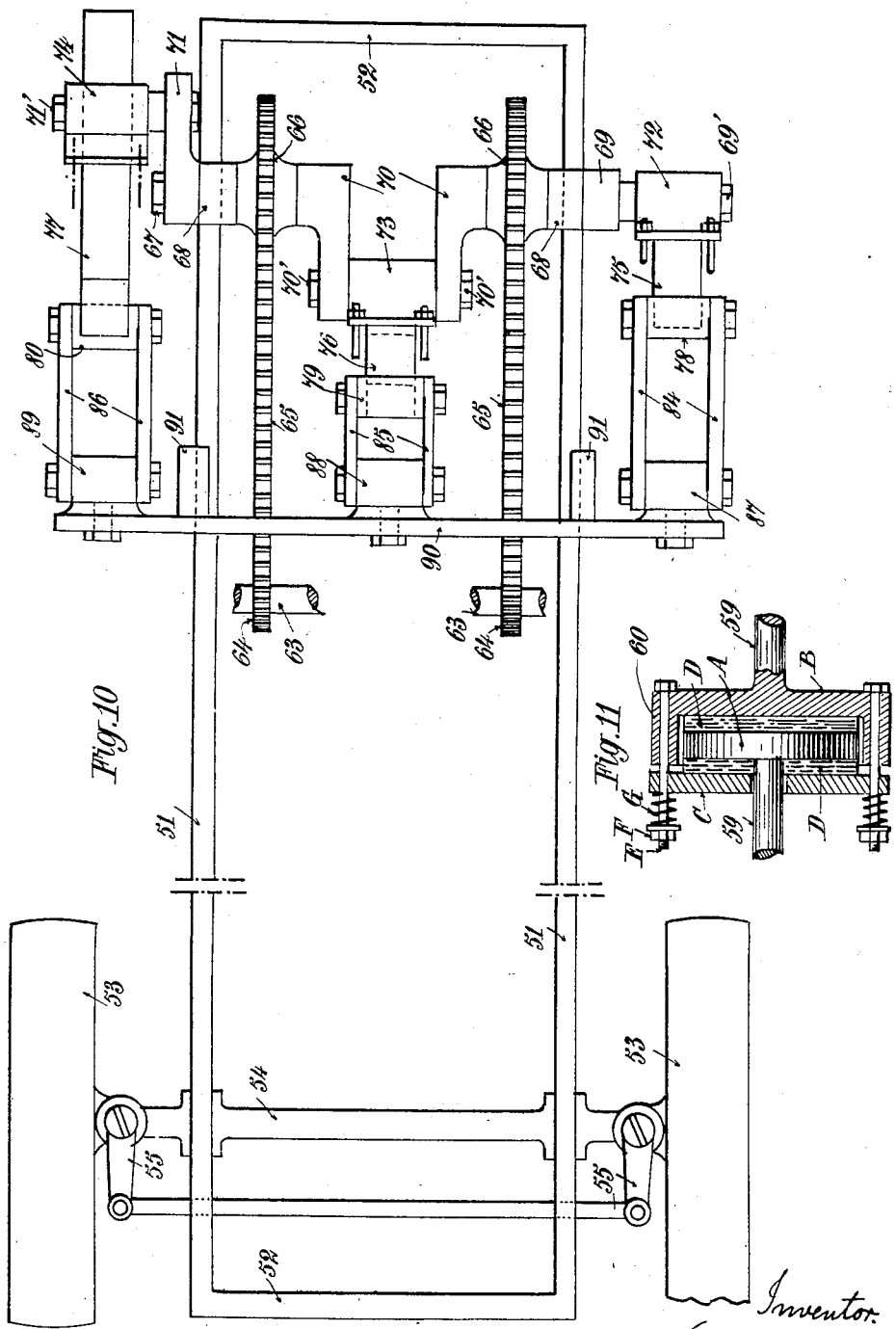

UNITED STATES PATENT OFFICE.

NESTOR MAUGER, OF PARIS, FRANCE, ASSIGNOR TO SOCIÉTÉ AUXILIAIRE D'EXPLOITATIONS INDUSTRIELLES, OF PARIS, FRANCE.

MOTOR-TRACTOR WITH PROPULSIVE LEVERS.

1,376,717.  Specification of Letters Patent.  Patented May 3, 1921.

Application filed March 19, 1919. Serial No. 283,658.

*To all whom it may concern:*

Be it known that I, NESTOR MAUGER, mechanician, a citizen of the French Republic, and residing at 10 Rue de l'Etoile, Paris, France, have invented certain new and useful Improvements in Motor-Tractors with Propulsive Levers, of which the following is a specification.

The present invention relates to a motor tractor with propulsive levers capable of being used for hauling agricultural machinery and vehicles and for any other purpose to which a traction apparatus of relatively slow speed can be applied.

This tractor differs from those in use at present in this respect that the movement of the apparatus is effected by connecting the motor not with wheels to which a continuous rotary motion is thus imparted but with levers having a reciprocatory motion and reacting against the ground whenever they come in contact therewith in the course of their movement, these levers however being capable of arrangement so as to impart a continuous or nearly continuous progressive movement to the apparatus.

The tractor which is the object of the invention is illustrated by way of example and more or less diagrammatically, in the accompanying drawings.

Figure 1 is a side elevation of the tractor.

Fig. 2 is a plan.

Fig. 3 shows the arrangement which enables the amplitude of movement of one of the levers to be varied.

Fig. 4 is a front view and a view in section of one of the crank disks on which the connecting rods are fixed.

Fig. 5 illustrates a different arrangement of the driving devices.

Fig. 6 represents an arrangement that can be employed for effecting the quick return of the levers.

Fig. 7 illustrates a buffer spring applied to the lower end of a lever.

Fig. 8 is a horizontal section and a vertical section of the arrangement which can be adopted for a shoe, intended to bear on the ground.

Fig. 9 is a side projection, with part section of a modified form of the apparatus.

Fig. 10 is a plan of same.

Fig. 11 illustrates the safety appliance in longitudinal section.

Fig. 12 is a view of details showing the way in which crank arms of the propelling crank shaft are keyed, and also a device by means of which the coupling point of the towed apparatus can be shifted.

The tractor consists substantially of two cheeks or sides 1 joined together by suitable transverse members 2. This chassis is pivotally connected with a hind-carriage consisting of a platform 4 supported by two wheels 5, this connection being effected by means of a bolster bolt 3. On this platform the driver's seat 6 is arranged. The steering can be effected by inclining the axis of the hind-carriage in relation to that of the chassis of the fore-carriage, This inclination can be obtained by any suitable mechanical devices actuated by a hand-wheel 7 or by a lever placed within reach of the driver and making it possible, when the apparatus is in motion, to turn the hind-carriage around the bolster bolt 3. Later on, will be explained how the steering can be effected by other means.

Between the sides 1, a motor of any suitable kind, benzin, steam, electric, etc., is arranged which is capable of actuating a pinion 8 through the medium of a gear arrangement which may comprise a coupling device, a change speed gear and a reversing gear. The pinion 8 is keyed to a shaft 9 which can thus be rotated at different speeds and in both directions.

The shaft 9 is mounted so as to be capable of rotating in the cheeks 1, this being due to ball bearings 10. On its ends, and outside the cheeks 1, the shaft 9 carries two crank disks 11 and 12 in relation with crank pins 13 and 14 to which the ends of two levers 15 and 16 are connected. These levers terminate in suitable shoes 17 and 18 intended to bear on the ground. The levers 15 and 16 are pivotally jointed in their central part, at 19, 20, in relation to the ends of two connecting rods 21, 22, the opposite ends of which are connected with crank pins 23, 24, mounted on crank disks 25, 26 arranged on each side on the cheeks 1 and capable of turning on these cheeks so as to cause the pivot points 23, 24 to move as will be explained further on.

Supposing, for the moment, that the points 23, 24 are fixed, that the devices are occupying the positions represented in Figs. 1 and 2, that the shaft 9 is rotating in the direction indicated by the arrow. It is to be observed, in the case under consideration, that the crank pins 13 and 14 are mounted at 180° in relation to one another. The crank pin 13, being at the inset point of its course, ascends, raising the lever 15 the shoe 17 of which has a tendency to leave the ground. During this time, the crank pin 14, being at the highest point of its course, descends, lowering the lever 16 the shoe 18 of which comes near the ground.

The levers 15 and 16 being connected with fixed points, by their central parts 19 and 20, by reason of the connecting rods 21 and 22, it is easy to see that the shoe 17 has a tendency to ascend being borne toward the back while the shoe 18 descends and is borne toward the front. The weight of the fore-carriage, resting at the moment referred to, on the shoe 17, this shoe cannot yield to the force which draws it to the back, a reaction takes place on the fore-carriage through the medium of the lever 15 and this fore-carriage is lowered slightly at the same time that it moves forward.

When the crank pins occupy the positions at 90° from those which are shown in Fig. 1, that is to say when they are situated in the horizontal axis of the disks, the two shoes 17 and 18 are in contact with the ground. The rotary motion of the shaft 9 continuing, the shoe 17 leaves the ground and the weight of the fore-carriage bears on the shoe 18. This shoe no longer being able to descend, the fore-carriage is raised, being at the same time, borne forward under the action of the crank pin 14 which assumes the position of the crank pin 13 in Fig. 1. From this moment, the fore-carriage descends, continuing to be borne forward, just at the moment when the two crank pins having returned to the horizontal diameter of the disks, the two shoes rest again on the ground the shoe 17 in front of the shoe 18. The phases of movement which have just been described recur, while the shoe 17 supports the weight of the fore-carriage and causes this latter to move forward in consequence of its reaction against the ground and while the shoe 18 ascends and is borne forward.

It is easy to see that, in the conditions which have just been shown, the progression of the apparatus is intermittent, for a slight period of stoppage occurs at the moment when the two shoes rest on the ground.

This intermittent progression can be obtained in another way when the apparatus is required to act more powerfully. For this purpose, a shaft 9′ is mounted between the cheeks 1, parallel to the shaft 9 and can be actuated, from the shaft 9, through the medium of a driving chain 27 and two pinions 28 and 29.

This shaft 9′ carries two crank disks 11″ and 12″ provided with crank pins 13″ and 14″.

Further, two crank disks 25″, 26″ are mounted against the cheeks in the same manner as the disks 25 and 26 and carry crank pins 23″, 24″. A second pair of levers can be pivotally connected with relation to this arangement so as to double the points of reaction and support of the apparatus against the ground.

When the four-lever arrangement is employed for the intermittent working, the crank pins 13, 14 and 13″, 14″ may be mounted on their disks, not at 180° but the one set facing the other. In this case, the two front shoes, for example, are brought into contact with the ground while the two hind shoes are raised and borne forward. The back shoes then come into contact with the ground while the front shoes are raised.

The apparatus may of course be provided with more than four levers so as to obtain a kind of caterpillar-like movement.

It is now easy to understand that, owing to a suitable mounting of the pins of the crank disks, it is possible to insure a continuous progression of the apparatus. In fact, all that is necessary, in the apparatus with four or with a larger number of levers, is to mount the crank pins on one and the same side alternately in relation to one another at such angles that a single shoe or several shoes on one and the same side are in action while the other shoe or shoes situated on the same side are at the dead center. The continuous action may thus be obtained with a four-lever apparatus and still more surely, with an apparatus provided with more than four levers.

It is evident that, in order to cause the tractor to move backward, all that is necessary is to reverse the direction of rotation of the shaft 9.

In all the foregoing, it has been assumed that the changes of speed in the working of the apparatus were obtained by varying the speed of rotation of the shaft 9 by means of the speed gear casing introduced between the motor and that shaft. This change of speed may however be obtained by keeping the speed of the shaft 9 uniform and varying the amplitude of the movements of the shoes in the horizontal direction.

Figs. 1, 2, 3 and 4 illustrate an example of arrangement capable of being adopted. The point or pin 23, in relation to which one end of the connecting rod 21 is pivotally connected, has hitherto been regarded as fixed. In reality, this pin is mounted on the crank-disk 25 supported by a shaft 30 against the cheek 1. The shaft 30 carries, inside the cheek, another crank disk 31 provided with a pin 32. This pin can be connected with an actuating device of any kind enabling it to be actuated so as to turn around the crank disk 25 and consequently, so as to move the pin 23.

Fig. 3 shows in fully drawn lines, the position occupied by the lever 15 when the pin 23 is moved away from the shaft 9. The dotted lines represent, as regards one and the same position of the pin 13, the novel position 15' occupied by the lever 15 when, through a rotation of 180° of the crank disk 25, the pin 23 has been brought to 23', that is to say nearer to the shaft 9.

The amplitude of the oscillations of the lower part of the lever 15 has been considerably increased. If this arrangement be applied to all the levers, it will be easy to vary at will, between a maximum and a minimum, the extent of the "step" effected by the apparatus during a given time, and that in passing through all the intermediate values.

It is also evident that, if the "step" be lengthened on one side of the machine only, this machine will turn on the opposite side without its being necessary to employ another steering arrangement.

Instead of moving the point 23 situated on the crank disk 25, it would also be possible to move the point 19 situated on the lever 15. This variation has not been shown, as the arrangements enabling it to be effected are thoroughly known in ordinary mechanics. It is only necessary to mention Stephenson's link-motions and their modifications.

Fig. 5 illustrates a varied arrangement of the levers. In this case, the lever 15 is actuated by its center part and the connecting rod 21 is at the upper end. The action is practically the same as in the preceding case.

The inventor has thought that it would be advantageous to impart to the levers a movement the speed of which varies according to the phases of their movements. It might, for example, be advantageous to move the lever relatively slowly while the shoe is bearing against the ground and to cause it to move rapidly while the shoe is raised above the ground. This arrangement would enable the time during which the shoe is inactive to be reduced and consequently, make the action of the apparatus more regular.

A considerable number of arrangements termed "quick return" arrangements may be employed for obtaining the result mentioned.

Fig. 6 represents, by way of example, a set of gearings capable of being introduced at any suitable point in the transmission arrangement. This set is composed of two double wheels 33, 34 and 35, 36 of different diameters. These wheels are toothed on only half of their periphery and the teeth are arranged so that, when the partial toothing of one of the large tooth wheels ceases to gear with the partial toothing of the small corresponding wheel, the teeth of the other two wheels come into engagement.

In Fig. 6, the large wheel 35 engages with the small wheel 34. If the wheel 35 is a driving wheel, the shaft on which the wheel 34 is mounted will rotate more quickly than that of the wheel 35. When the wheels, in rotating, reach the ends of the partial toothing actually in engagement, the small wheel 36 will engage with the large wheel 33. The driven shaft will thus rotate less quickly than the driving shaft. The inventor considers it useless to dwell on this matter.

Fig. 7 illustrates an arrangement capable of being applied to the lower end of the levers to deaden the shock which may occur at the moment when the shoe comes in contact with the ground. The lower end of the lever 15 is formed with a cylindrical hollow 37 into which a rod 38 can penetrate forming a pump and provided with a spherical bearing or ball and socket joint 39 intended to support the shoe. A strong spiral spring 40 is introduced between the end of the hollow 37 and the upper part of the rod 38 so as to form a buffer. It should be understood that this arrangement is only given as an example and that pneumatic, hydraulic and other buffers may be employed.

Fig. 8 illustrates an example of construction of the shoe intended to bear on the ground. This shoe is composed of a metal casing 41 the upper part of which is formed with a spherical hollow intended to receive the spherical bearing 39 situated at the end of the lever 15 so as to form a universal joint enabling the shoe to rest on the ground in spite of unevenness in the latter. In the casing 41, prisms 42 made of suitable material are forcibly fitted. They are intended to assure the adhesion of the shoe and also to deaden the shocks to a certain extent. This material may be for example wood placed on end, fiber, a preparation of india-rubber, etc.

It should be clearly understood that the buffer and the universal joint are not regarded by the inventor as parts indispensable to the proper action of his apparatus but as improvements capable of being employed in certain circumstances.

At a suitable point in the chassis, an auxiliary shaft may be arranged, capable of being connected with the motor shaft by any suitable gear comprising a coupling and speed reducing gearings. This shaft will be provided with a driving pulley capable of receiving a belt intended to actuate apparatus of any kind when the tractor is at rest and the driving shaft 9 uncoupled.

Figs. 9, 10, 11, and 12 show another form of the tractor according to the invention intended to allow and facilitate the continuous and jerkless movement of the apparatus, to provide safety appliances and to simplify the construction.

This form of tractor consists essentially of a chassis formed of two frame beams 51 made of I iron and a certain number of cross bars 52 of which two only are shown in the drawing. The rear end of the chassis is carried by two carrying and steering wheels 53, fitted on both ends of an axle 54, provided with steering means 55 which can be conveniently brought into play by a steering wheel 56, placed so as to be within the reach of the driver whose seat is not represented.

Above the axle 54, is placed the motor 57, which may be of any convenient type, and, on the shaft of said motor, is fitted a clutch 58 which may be acted upon by the driver through a pedal.

The driving shaft 59 is intersected by a safety appliance 60, shown in longitudinal section in Fig. 11. This figure shows that the rear end of shaft 59 carries a coupling A keyed on this end, or being made as a part of it.

This coupling is held between two plates D, made of any convenient material, such as fiber for instance, which are held elastically fast against both sides of the coupling A by a cap B and by a plate C, held together by bolts E, on which are screwed nuts F, springs G being interposed between the nuts and plate C in order to secure an elastic fastening. The cap B is keyed onto the front part of the driving shaft 59 or is made integral with said part of this shaft.

It is easy to understand that, on account of the nuts F and springs G, the fastening of the plates D against the coupling A can be secured in such a way that the coupling will drive by friction the cap B so long as the strain to transmit does not exceed a settled limit. If the strain which the shaft 59 has to transmit exceeds this settled limit, the coupling A, overcoming the friction produced against it by the plates D, turns between these plates without driving the cap B and consequently the front part of shaft 59.

This arrangement is made for the purpose of keeping the driving parts safe from excessive strains and especially safe from the strains that may be suddenly produced when the towed apparatus meets an obstacle; for instance, when a plow hits a large stone or a strong root. The gearing of the change of gear especially, is, by this means, protected against breakage which often happens on tractors not fitted with safety appliances.

In front of cap B of the safety appliance 60, the shaft 59 ends in a gear box 61, the pinions of which are acted upon by means of a lever 62, placed in reach of the driver. This gear box holds conical cog-wheels by means of which the longitudinal shaft 59 can drive, at variable speed, in one way or in the reverse, a cross shaft 63 on which are keyed two pinions 64. These pinions, by means of chains 65, drive two cog-wheels 66, keyed onto a shaft 67, which is set so as to be able to turn on the bearings 68, said bearings being carried by the frame beams of the chassis.

The shaft 67 is fitted with three crank arms set at 120°, shown in 69, 70 and 71. The crank arm 70 is placed at the middle of the shaft on the axis of the machine, between the frame beams, and the crank arms 69 and 71 are placed at both ends of the shaft, outside of the beams.

The pins 69', 70', 71', of the tree crank arms are respectively engaged in bearings laid out on rests 72, 73, 74 fastened by means of bolts and counterplates, on the middle part of the three propulsing levers 75, 76, 77, the top ends of which carry similar bearings 78, 79, 80 fastened in the same way and through which pass spindles of articulation 81, 82, 83 connecting these bearings with the ends of coupled connecting rods 84, 85, 86 of which the other ends are articulated in relation to bearings 87, 88, 89, fitted on an I iron girder 90, carried by uprights 91, projecting up from the frame beams 51 of the chassis. The uprights 91 are braced by means of cross beams 92, 93 which bear on the frame beams, and similar cross beams may be diposed on both sides of the middle bearing 88, in order to enable the girder 90 to resist, without bending, to the strains of reaction to which it may be exposed when the apparatus is working.

The tractor, constructed as stated above, works in the following way: The motor 57 being started and the driver on his seat, the clutch 58 is acted upon so as to start shaft 59 revolving which acts on shaft 63 by means of the change of gear 61. This shaft 63 drives shaft 67 by means of chains and cog-wheels 64, 65, 66. Let us suppose that shaft 67 revolves in the same way as the hands of a watch, and that the various parts are in the position illustrated in Fig. 9. The lever or propulsing foot 75 bears on the ground. As the crank arm revolves in the same way as the hands of a watch, it has a raising and backward driving action on foot 75, but as this foot bears on the ground, it cannot be forced backward, and accordingly, a forward motion of the tractor's chassis is produced by reaction, at the same time as a slight lowering of the chassis. During this forward movement, as shaft 67 is still revolving, the crank arm 71 brings forward the foot 77 and begins to lower this foot, which comes in contact with ground in a forward slanting position as shown in the drawing. At the same time the foot 75 is lifted from the ground, and the weight of the front part of the machine bears on foot 77 which is drawn backward by its crank arm 71. On account of the reaction produced by this foot, which cannot slide on the ground, the chassis is drawn forward and slightly raised up, but lowers itself afterward when foot 77 has passed the vertical position. During that time, foot 76 has been brought forward by its crank arm in the same position previously held by foot 77. The cycle of motions is then renewed and foot 76 comes to bear on the ground in front of foot 77, which is raised up by its crank arm.

One can easily see that this way of driving the feet corresponds to the way shown in Fig. 5.

Owing to the use of these three feet, driven by crank arms set at 120°, a steady and jerkless motion of the apparatus is obtained.

The steering is secured by means of the rear wheels 53 driven by the steering wheels 56, and the change of speed is obtained through the gear box 61 controlled by lever 62.

It is easy to understand that the tractor can as well proceed backward as forward. In order to make it work backward, there is nothing else to do than to reverse the way in which the crank shaft 67 revolves, and, for that purpose, the gear box is fitted with a reversing device working on any of the speeds supplied by this box.

As a rule, the coupling of the towed apparatus is made on the rear cross bar of the tractor. It may however be useful to carry the coupling point more forward and, for this purpose, the device shown in Fig. 12 has been provided for. A plate 95 is made so as to fit between the ribs of the I iron beams of the frame 51. This plate carries an axle 96 to which may be fastened the towing parts. Two holes are bored in this plate 95 intended to admit the fixing bolts 97 which can pass through the plate and frame beams against which this plate is laid.

Various holes 98, Fig. 12, conveniently spaced, are bored in the frame beams in order that the plate may be fastened in any part of the length of these beams. Obviously, a plate is provided for each beam, so that a symmetrical coupling may be obtained.

As the tractor can as well work backward or forward by the simple means of a reversing of the rotation of the driving shaft, it may be useful, in plowing for instance, to fix the towing line of the towed apparatus, which in that case is a plow, on the side of the tractor, in such a way that this plow, which would be fitted with a double set of plowshares, might work in both directions without being obliged to turn around at the ends of the field. The side coupling of the plow can be made in any convenient manner, but devices must be provided, so as to insure as efficiently the steering and the controlling of the tractor when it is proceeding forward or working backward.

What I claim is:—

1. In an automobile tractor, the combination of a chassis and straight propelling levers, with a link for each lever, one end of said link being journaled at the upper extremity of the lever and the other end journaled on said chassis, each of said levers being provided with a bearing on its middle portion, a crank shaft journaled transversely on said chassis and having a crank for each of said levers engaging in the corresponding lever bearing, and means for revolving said crank shaft for the purpose of actuating the propelling levers.

2. In an automobile tractor, the combination of a chassis and straight propelling levers at one end of said chassis with a pair of wheels mounted at the other end of said chassis for steering and support, a link for each of said levers, one end of said link being journaled at the upper extremity of the lever and the other end journaled on said chassis, a bearing located midway between the extremities on each of the levers, a crank shaft journaled transversely on said chassis and provided with a crank for each of said levers engaging in the corresponding lever bearing, said cranks being circumferentially displaced with respect to each other and means for revolving said crank shaft for the purpose of actuating the propelling levers.

In testimony whereof I affix my signature in presence of two witnesses.

NESTOR MAUGER.

Witnesses:
 JOHN F. SIMONS,
 PAUL FANCHER.